United States Patent
Zi et al.

(10) Patent No.: US 11,062,676 B2
(45) Date of Patent: Jul. 13, 2021

(54) BRIGHTNESS ADJUSTMENT METHOD AND APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Feng Zi, Beijing (CN); Jian Sun, Beijing (CN); Hao Zhang, Beijing (CN); Lili Chen, Beijing (CN); Ziqiang Guo, Beijing (CN); Binhua Sun, Beijing (CN); Jiyang Shao, Beijing (CN); Yakun Wang, Beijing (CN); Xinjian Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/700,635

(22) Filed: Dec. 2, 2019

(65) Prior Publication Data
US 2020/0243044 A1     Jul. 30, 2020

(30) Foreign Application Priority Data
Jan. 29, 2019   (CN) .......................... 201910085632.5

(51) Int. Cl.
*G09G 5/10* (2006.01)
*G06F 3/01* (2006.01)

(52) U.S. Cl.
CPC .............. *G09G 5/10* (2013.01); *G06F 3/013* (2013.01); *G09G 2320/0626* (2013.01);
(Continued)

(58) Field of Classification Search
None
See application file for complete search history.

(56) References Cited

U.S. PATENT DOCUMENTS

| 2016/0116979 | A1* | 4/2016 | Border | G06K 9/222 345/156 |
|---|---|---|---|---|
| 2018/0180893 | A1 | 6/2018 | Gupta | |
| 2019/0206362 | A1 | 7/2019 | Li | |

FOREIGN PATENT DOCUMENTS

| CN | 104808773 A | 7/2015 |
|---|---|---|
| CN | 105138119 A | 12/2015 |

(Continued)

OTHER PUBLICATIONS

First Chinese Office Action dated Aug. 14, 2020, received for corresponding Chinese Application No. 201910085632.5, 20 pages.

*Primary Examiner* — Vu Nguyen
(74) *Attorney, Agent, or Firm* — Kinney & Lange, P.A.

(57) ABSTRACT

A brightness adjustment method and a brightness adjustment apparatus are provided. The brightness adjustment method is applied to an augmented reality device and includes acquiring at least one of position information or attitude information of the augmented reality device; determining a brightness corresponding to the acquired at least one of the position information or the attitude information according to an established correspondence relation between brightness information and at least one of position information or attitude information; and controlling the augmented reality device to display at the brightness.

17 Claims, 7 Drawing Sheets

(52) U.S. Cl.
CPC ... *G09G 2330/021* (2013.01); *G09G 2354/00* (2013.01); *G09G 2360/144* (2013.01); *G09G 2360/16* (2013.01)

(56) References Cited

FOREIGN PATENT DOCUMENTS

| | | | |
|---|---|---|---|
| CN | 105611043 A | 5/2016 | |
| CN | 105807909 A | 7/2016 | |
| CN | 106095102 A | 11/2016 | |
| CN | 106157930 A | 11/2016 | |
| CN | 106297733 A | 1/2017 | |
| CN | 106455251 A | 2/2017 | |
| CN | 107749289 A * | 10/2017 | ......... G02B 27/0101 |
| CN | 107749289 A | 3/2018 | |
| CN | 107977083 A | 5/2018 | |
| CN | 108196366 A | 6/2018 | |
| CN | 108205409 A | 6/2018 | |
| CN | 108810264 A | 11/2018 | |
| CN | 108965589 A | 12/2018 | |
| DE | 102016225265 A1 | 6/2018 | |

* cited by examiner

BRIGHTNESS ADJUSTMENT METHOD AND APPARATUS

CROSS-REFERENCE TO RELATED APPLICATION

This application claims priority to Chinese Patent Application No. 201910085632.5 filed in China on Jan. 29, 2019, the disclosure of which is incorporated herein in its entirety by reference.

TECHNICAL FIELD

The present disclosure relates to the field of display technology, and in particular, relates to a brightness adjustment method and a brightness adjustment apparatus.

BACKGROUND

An Augmented Reality (AR) technology adds a virtual world to a real world and enables a human-world interaction, and physical information in the virtual world not existing in the real word is superimposed onto the real world through simulation. Thus, virtual data is applied to the real world. After a pair of AR glasses perceives the superimposition, a user may achieve a sense of the real word being transcended.

SUMMARY

The present disclosure provides a brightness adjustment method and a brightness adjustment apparatus.

In a first aspect, the present disclosure provides a brightness adjustment method. The brightness adjustment method is applied to an augmented reality device and includes: acquiring at least one of position information or attitude information of the augmented reality device; determining a brightness corresponding to the acquired at least one of the position information or the attitude information according to an established correspondence relation between brightness information and at least one of position information or attitude information; controlling the augmented reality device to display at the brightness.

In a second aspect, the present disclosure provides a brightness adjustment apparatus. The brightness adjustment apparatus is applied to an augmented reality device and includes an acquisition circuitry, configured to acquire at least one of position information or attitude information of the augmented reality device; a search circuitry, configured to determine a brightness corresponding to the acquired at least one of the position information or the attitude information according to an established correspondence relation between brightness information and at least one of position information or attitude information; a control circuitry, configured to control the augmented reality device to display at the brightness.

In a third aspect, the present disclosure provides an augmented reality device. The augmented reality device includes the brightness adjustment apparatus according to the above first aspect.

In a fourth aspect, the present disclosure provides a brightness adjustment apparatus. The device includes a memory, a processor, and a computer program stored on the memory and executable by the processor, wherein when the computer program is executed by the processor, the processor implements the steps in the brightness adjustment method according to the above first aspect.

In a fifth aspect, the present disclosure provides a computer program stored on the computer readable storage medium, wherein, when the computer program is executed by a processor, the processor implements the steps in the brightness adjustment method according to the above first aspect.

DETAILED DESCRIPTION

In order to make technical problems, technical solutions and advantages to be solved by the embodiments of the present disclosure clearer, the present disclosure will be described in detail with reference to the accompanying drawings and specific embodiments hereinafter.

A pair of Augmented Reality (AR) glasses realizes superimposition of virtual information and a real world through a perspective effect. However, an environment of the real world is dynamic, and a light intensity of the real world is also dynamic. In a case that a brightness of the pair of AR glasses is determined, only the real world may be seen when ambient light is strong, and the virtual information may not be seen; only the virtual world may be seen when the ambient light is weak, and the real world may not be seen. Therefore, a display effect of the pair of AR glasses will be influenced by light in the real world.

Embodiments of the present disclosure provide a brightness adjustment method and a brightness adjustment apparatus, which may realize intelligent adjustment of brightness of an Augmented Reality device, improve a response time of the AR device, and reduce power consumption of the AR device.

Figure 1:
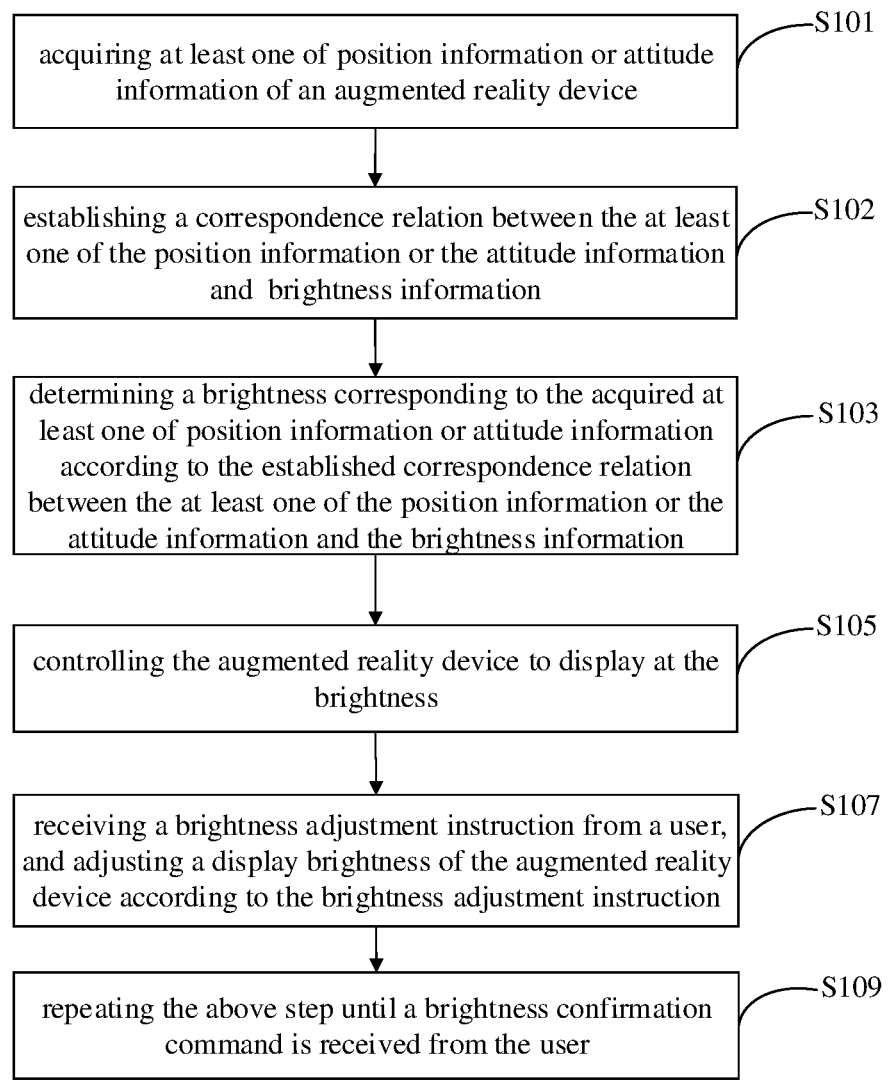
FIG. 1 is a flow chart of a brightness adjustment method of the present disclosure.

Referring to FIG. 1, some embodiments of the present disclosure provide a brightness adjustment method applied to an augmented reality device. The method includes following steps S101-S105.

S101: acquiring at least one of position information or attitude information of the augmented reality device.

S103: determining a brightness corresponding to the acquired at least one of position information or attitude information according to an established correspondence relation between at least one of position information or attitude information and brightness information.

S105: controlling the augmented reality device to display at the brightness.

In this embodiment, the correspondence relation between the at least one of the position information or the attitude information of the augmented reality device and the brightness information is established in advance. When adjusting the brightness of the augmented reality device, the brightness of the augmented reality device is directly determined according to the acquired at least one of position information or attitude information and the correspondence relation, and the brightness of the augmented reality device is no longer recalculated and adjusted. In this way, response time of the augmented reality device may be improved, power consumption of the augmented reality device may be reduced, in addition, an influence to the brightness due to errors in each brightness adjustment may be avoided, and consistency of the brightness of the augmented reality device may be improved.

For example, in a case that an active range of the augmented reality device is within an enclosed space, the brightness corresponding to the at least one of the position information or the attitude information may be acquired according to the at least one of the position information or the attitude information of the augmented reality device. The position information of the augmented reality device includes a specific position of the augmented reality device in the enclosed space, and the attitude information includes an orientation, an angle, and the like of the augmented reality device.

For example, a user uses the augmented reality device in a room only. In a case that no natural light source is used for illumination in the room, but an artificial light source such as an electric lamp is used for illumination only, the ambient brightness is only related to a brightness of the artificial light source and is not affected by natural light. In a case that the brightness of the artificial light source is determined, the brightness of the real world seen by the augmented reality device is only related to the at least one of the position information or the attitude information of the augmented reality device. Thus, the at least one of the position information or the attitude information of the augmented reality device may be associated with the brightness of the augmented reality device. In a case that the user is at different positions and/or in different attitudes in the room, such as close to a large screen, close to a wall, close to the ground, or close to a window, brightnesses of the ambient light are different, so that the at least one of the position information or the attitude information of the augmented reality device may be acquired, and brightness information corresponding to the acquired at least one of the position information or the attitude information may be determined according to the established correspondence relation between the at least one of the position information or the attitude information and the brightness information of the augmented reality device, and the augmented reality device may be controlled to display with the brightness corresponding to the brightness information. The correspondence relation may be established in advance and stored.

In a case that an augmented reality device is used in a museum, a gallery and another room, more users may use an augmented reality device. If the brightness of the augment reality device needs to be adjusted every time the augmented reality device is used, a large amount of time and power consumption will be consumed. In a case that the brightness of the augmented reality device used indoors is adjusted by the technical solution of the present embodiment, the brightness of the augmented reality device is directly determined according to the acquired at least one of the position information or the attitude information and the stored correspondence relation between the at least one of the position information or the attitude information and the brightness information, and the brightness of the augmented reality device is no longer recalculated and adjusted, the response time of the augmented reality device may be improved, the power consumption of the augmented reality device may be reduced, and the influence to the brightness due to errors in each brightness adjustment may be avoided, and the consistency of the brightness of the augmented reality device may be improved.

In particular, a position and an orientation of the augmented reality device may be acquired by a tracker sensor. The tracker sensor may detect the position and the orientation of the augmented reality device. The position of the augmented reality device may include a geographical coordinate (such as a Global Positioning System (GPS) coordinate of the augmented reality device) and/or a plane coordinate or a polar coordinate of the augmented reality device in the enclosed space. The orientation of the augmented reality device includes an angle of the augmented reality device relative to a reference line, such as an elevation angle or a depression angle of the augmented reality device relative to the ground and/or an orientation angle of the augmented reality device relative to a reference line in the enclosed space. The tracker sensor includes one or more of a 3-axis accelerometer, a 3-axis gyroscope, or a 3-axis magnetometer. After the tracker sensor detects movement of the augmented reality device, at least one of the position or the attitude of the augmented reality device may be determined based on an acceleration, an angular velocity, and the like detected by the tracker sensor. Of course, the tracker sensor employed in the present embodiment is not limited to a 3-axis accelerometer, a 3-axis gyroscope, a 3-axis magnetometer, etc. Any instrument capable of acquiring at least one of position information or attitude information may be used as the tracker sensor of the present embodiment.

Since the brightness of the augmented reality device needs to be determined according to the correspondence relation between the at least one of the position information or the attitude information and the brightness information, the correspondence relation between the at least one of the position information or the attitude information and the brightness information needs to be established in advance. If the correspondence relation between the at least one of the position information or the attitude information and the brightness information is not established in advance, it is necessary to collect a current ambient brightness outside the augmented reality device, determine, based on the collected ambient brightness, brightness information of the augmented reality device matching the ambient brightness, and control the augmented reality device to display at a brightness corresponding to the brightness information. Thus, referring to FIG. 1, prior to the step 103, the method further includes a step 102.

S102: establishing the correspondence relation between the at least one of the position information or the attitude information and the brightness information.

Figure 2:
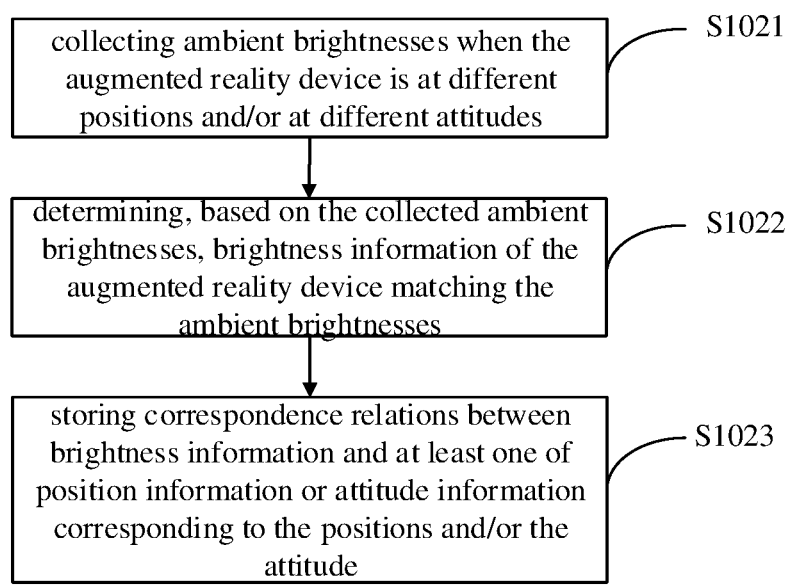
FIG. 2 is a detailed flowchart of steps of the brightness adjustment method of the present disclosure.

Further, referring to FIG. 2, the step S102 of establishing the correspondence relation between the at least one of the position information or the attitude information and the brightness information includes following sub-steps S1021-S1023.

S1021: collecting ambient brightnesses when the augmented reality device is at different positions and/or at different attitudes;

S1022: determining, based on the collected ambient brightnesses, brightness information of the augmented reality device matching the ambient brightnesses;

S1023: storing correspondence relations between brightness information and the at least one of position information or attitude information corresponding to the positions and/or the attitude.

In the sub-step S1021, the ambient brightness may be acquired by a light collection device. The light collection device may include a light sensor, and the light sensor generates the current ambient light brightness according to current ambient light. Specifically, the light sensor may receive ambient light in a current environment, and convert the received light into an electrical signal, and an intensity of the light corresponds to a current value or a voltage value of the electrical signal. Thus, the electrical signal acquired by the light sensor according to the current ambient light may characterize the current ambient brightness. The light collection device may also be a camera, and the camera is configured to obtain a current environment image, obtain a current ambient brightness according to a brightness of the current environment image. Specifically, a brightness value of a certain pixel point may be acquired according to R, G, B values of the pixel point. For example, the brightness value=0.299r+0.587g+0.114b, wherein r, g, b correspond to the R, G, B values of the pixel point. An average brightness of the current environment image is acquired by calculating a brightness value of each pixel point of the collected current environment image, then calculating an average brightness of brightness values of all pixel points, and taking the acquired average brightness as the current ambient brightness.

Figure 3:
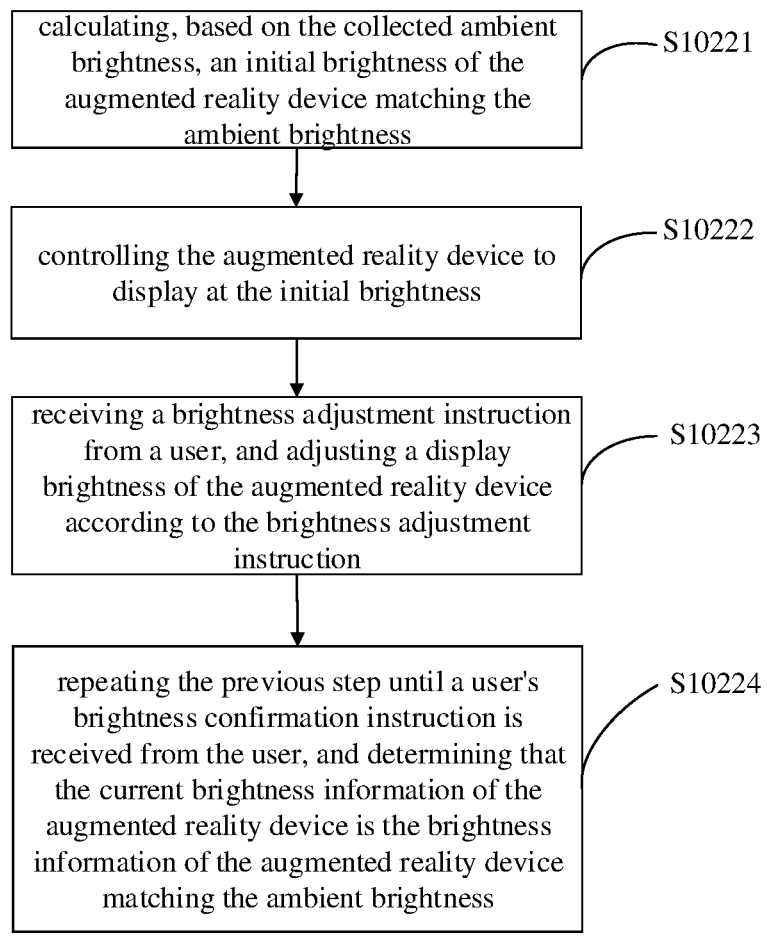
FIG. 3 is a detailed flowchart of sub-steps of the brightness adjustment method of the present disclosure.

Referring to FIG. 3, the sub-step S1022 of determining, based on the collected ambient brightness, the brightness information of the augmented reality device matching the ambient brightness includes following sub-steps S10221-S10224.

S10221: calculating, based on the collected ambient brightness, an initial brightness of the augmented reality device matching the ambient brightness;

S10222: controlling the augmented reality device to display at the initial brightness;

S10223: receiving a brightness adjustment instruction from a user, and adjusting a display brightness of the augmented reality device according to the brightness adjustment instruction;

S10224: repeating the previous step until a user's brightness confirmation instruction is received from the user, and determining that the current brightness information of the augmented reality device is the brightness information of the augmented reality device matching the ambient brightness.

The brightness adjustment instruction and the brightness confirmation instruction may be an eye action of the user collected by a camera of the augmented reality device, and may also be an operation instruction inputted by the user through an input device of the augmented reality device. In particular, an eye state of the user may be detected by the camera, the eye state includes an eye-open amplitude between upper and lower eyelids, an eye-closure, and a blink frequency. In a case that the camera acquires a condition that the eye-open amplitude of the user is smaller than a first preset amplitude or the blink frequency is larger than a first preset value, it may be considered that the current display brightness is over large, and the current display brightness needs to be lowered until the eye-opening amplitude of the user is not less than the first preset amplitude or the blink frequency is not larger than the first preset value. In a case that the camera acquires a condition that the eye-open amplitude of the user is larger than a second preset amplitude or the blink frequency is smaller than a second preset value, it may be considered that the current display brightness is over small, it is necessary to increase the current display brightness until the eye-opening amplitude of the user is not larger than the second preset amplitude or the blink frequency is not smaller than the second preset value, wherein the eye-opening amplitude and the blink frequency of the user are the above-mentioned eye actions of the user.

The user may also adjust the display brightness of the augmented reality device by using a brightness adjustment button of the augmented reality device, and confirm the display brightness by using a brightness confirmation button of the augmented reality device after the display brightness is adjusted to an appropriate display brightness.

In a specific example, after the brightness adjustment instruction of the user is inputted, the display brightness of the augmented reality device may be automatically lowered or raised, and when the user is satisfied with the display brightness, the display brightness may be confirmed as an optimal display brightness by two consecutive blinking actions, and brightness information corresponding to the optimum display brightness may be recorded and stored.

In another specific embodiment, corresponding brightness information may be acquired by combining time information with the at least one of the position information or the attitude information. In some scenarios, the ambient brightness is associated with both the time information and the position information and/or the attitude information, such as a position A at a noon time period corresponds to an ambient brightness value, the position A at an afternoon time period corresponds to another ambient brightness value. Since the display brightness of the augmented reality device is mainly influenced by the ambient brightness, the brightness information of the augmented reality device is associated with both the time information and the at least one of the position information or the attitude information.

Different correspondence relations between the at least one of the position information or the attitude information and the brightness information at different time points may be established in advance. When a user uses the augmented reality device, current time may be acquired, and brightness information corresponding to the current time and the acquired at least one of the position information or the attitude information may be determined according to different correspondence relations between the at least one of the position information or the attitude information and the brightness information at different time points, and the augmented reality device may be controlled to display at the brightness corresponding to the brightness information.

The current time may be acquired by using a clock on the augmented reality device, and the current time may also be acquired by receiving time information sent from the outside. The current time may be a fixed time period, such as a noon time period, an afternoon time period, an evening time period, and the like.

In another specific embodiment, corresponding brightness information may also be acquired in combination with time, weather, and at least one of position information or attitude information. In some scenarios, the ambient brightness is associated with all of the time, the weather and the at least one of the position information or the attitude information, such as the position A at the noon period of a sunny day corresponds to a first ambient brightness value, the position A at the afternoon period of the sunny day corresponds to a second ambient brightness value, the position A at the noon time period of an overcast day corresponds to a third ambient brightness value, and the position A at the afternoon time period of the overcast day corresponds to a fourth ambient brightness value, because the display brightness of the augmented reality device is mainly affected by the ambient brightness, the brightness information of the augmented reality device is associated with all of the time, the weather, and the at least one of the position information or the attitude information.

Different correspondence relations between at least one of position information or attitude information and brightness information at different time periods and/or under different weather conditions may be established in advance. When a user uses the augmented reality device, the current time and/or the current weather may be acquired. Brightness information corresponding to the current time, the current weather, and the acquired at least one of the position information or the attitude information may be determined according to different correspondence relations between the at least one of the position information or the attitude information and the brightness information at different time periods and/or under different weather conditions, and further the augmented reality device may be controlled to display at the brightness corresponding to the brightness information.

The current time may be acquired by using a clock on the augmented reality device, and the current time may also be acquired by receiving time information sent from the outside. The current time may be a fixed time period, such as the noon time period, the afternoon time period, the evening time period, and the like.

The weather information sent from the outside may be received to obtain the current weather, such as a sunny day, an overcast day, a rainy day, etc., and a weather mode for the augmented reality device may be manually selected by the user. Under each weather mode, different correspondence relations between at least one of position information or attitude information and brightness information at different time periods are stored. When brightness adjustment is performed, a weather mode to which the current weather belongs is firstly determined, then corresponding brightness information is searched by using the correspondence relation between the brightness information and the at least one of the position information or the attitude information at the current time and under the weather mode.

Further, after the step S105 of controlling the augmented reality device to display with the brightness information, the method further includes steps S107-S109.

S107: receiving a brightness adjustment instruction from a user, and adjusting a display brightness of the augmented reality device according to the brightness adjustment instruction.

S109: repeating the above step until a brightness confirmation command is received from the user.

After the brightness information of the augmented reality device is directly determined and the augmented reality device is controlled to display at the brightness corresponding to the brightness information, if the display brightness of the augmented reality device at this time cannot satisfy the user's requirement, the embodiment may also enable a micro-adjustment of the display brightness of the augmented reality device according to an instruction of the user, so as to meet different requirements of different people on brightness. Since a process of the brightness adjustment is fine-tuned on a basis of determining the brightness information of the augmented reality device, a magnitude of the brightness adjustment is small and therefore the time taken for the adjustment is shorter than the time required for an associated brightness adjustment, whereas effects of improving the response time of the augmented reality device and reducing the power consumption of the augmented reality device may still be achieved. After the brightness confirmation instruction is received from the user, a correspondence relation among the brightness information corresponding to the current display brightness, the at least one of the position information or the attitude information, and the ambient brightness may be stored.

The brightness adjustment instruction and the brightness confirmation instruction may be an eye action of the user collected by a camera of the augmented reality device, and may also be an operation instruction inputted by the user through an input device of the augmented reality device. In particular, an eye state of the user may be detected by the camera, the eye state includes an eye-open amplitude between upper and lower eyelids, an eye-closure, and a blink frequency. In a case that the camera acquires a condition that the eye-open amplitude of the user is smaller than a first preset amplitude or the blink frequency is larger than a first preset value, it may be considered that the current display brightness is over large, and the current display brightness needs to be lowered until the eye-opening amplitude of the user is not less than the first preset amplitude or the blink frequency is not larger than the first preset value. In a case that the camera acquires a condition that the eye-open amplitude of the user is larger than a second preset amplitude or the blink frequency is smaller than a second preset value, it may be considered that the current display brightness is over small, it is necessary to increase the current display brightness until the eye-opening amplitude of the user is not larger than the second preset amplitude or the blink frequency is not smaller than the second preset value, wherein the eye-opening amplitude and the blink frequency of the user are the above-mentioned eye actions of the user. The user may also adjust the display brightness of the augmented reality device by using a brightness adjustment button of the augmented reality device, and confirm the display brightness by using a brightness confirmation button of the augmented reality device after the display brightness is adjusted to an appropriate display brightness.

After the brightness confirmation instruction is received from the user, the correspondence relation established in advance between the at least one of the position information or the attitude information and the brightness information may be updated according to the current brightness information of the augmented reality device, and the current brightness of the augmented reality device is stored as brightness information corresponding to the at least one of the position information or the attitude information.

Figure 4:
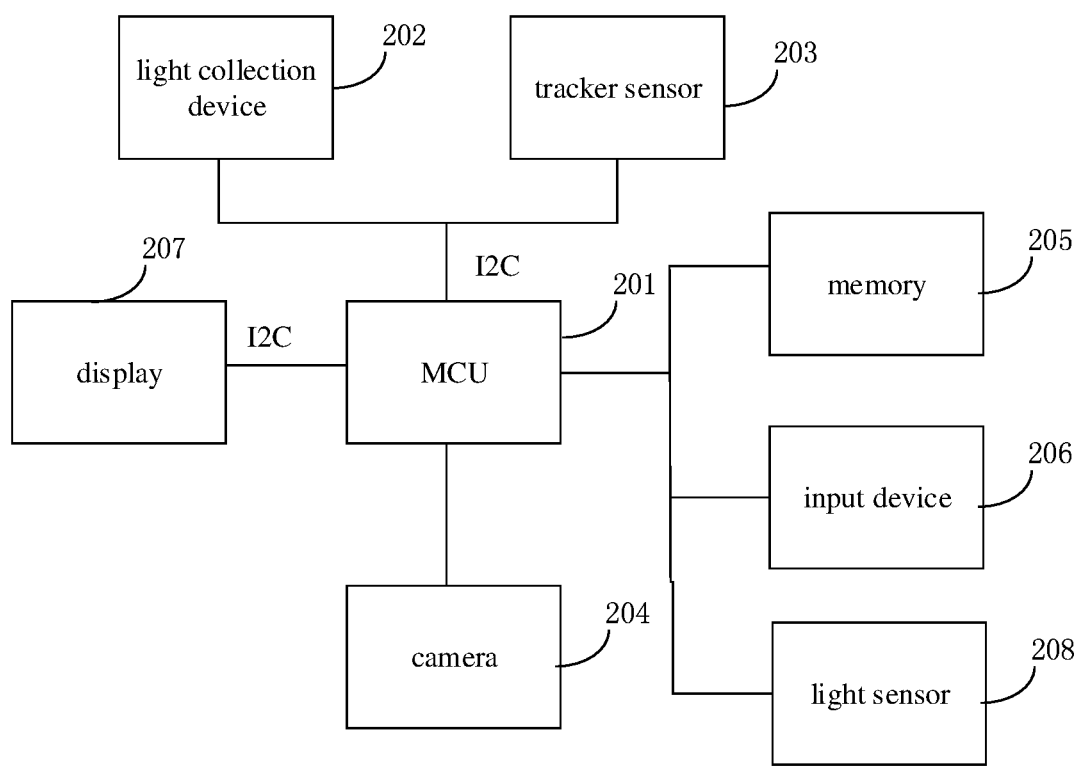
FIG. 4 is a schematic diagram of components in an Augmented Reality device of the present disclosure.

The brightness adjustment method of the present disclosure is further described below with reference to the drawings and specific embodiments:

As shown in FIG. 4, the brightness adjustment method of the present embodiment is applied to an augmented reality device. Hardware of the augmented reality device may include a Microcontroller circuit 201 (such as a Microcontroller Unit, MCU), a light collection device 202, a tracker sensor 203, a camera 204, a memory 205, an input device 206, a display 207, and a light sensor 208. The light collection device 202 is configured to sense external light in real time and convert the external light into an electric signal, and transmits the electric signal to the MCU through an Inter-Integrated-Circuit (I2C) interface. The I2C interface is well known in the art and the present disclosure is not described further herein. The tracker sensor 203 is configured to acquire an acceleration, an attitude deviation of a gyroscope, and direction information of the geomagnetism in real time, and covert the information as an electric signal and transmit the electric signal to the MCU 201. The MCU 201 may accurately know movement of the user, at least one of position information or attitude information of the user through the I2C interface. The camera 204 is configured to deliver (e.g., via a USB signal) a screen image to the MCU 201 during an adjustment mode, and the MCU 202 is further configured to control, through the I2C interface, the display 207 of the augmented reality device to display. The memory 205 is configured to store a correspondence relation between at least one of position information or attitude information and brightness information. The input device 206 is used for a user to input and/or confirm information, such as an operation instruction, a brightness value, etc. The light sensor 208 is configured to sense ambient light, convert the sensed ambient light into an electrical signal, and transmit the electrical signal to the MCU 201.

Figure 5:
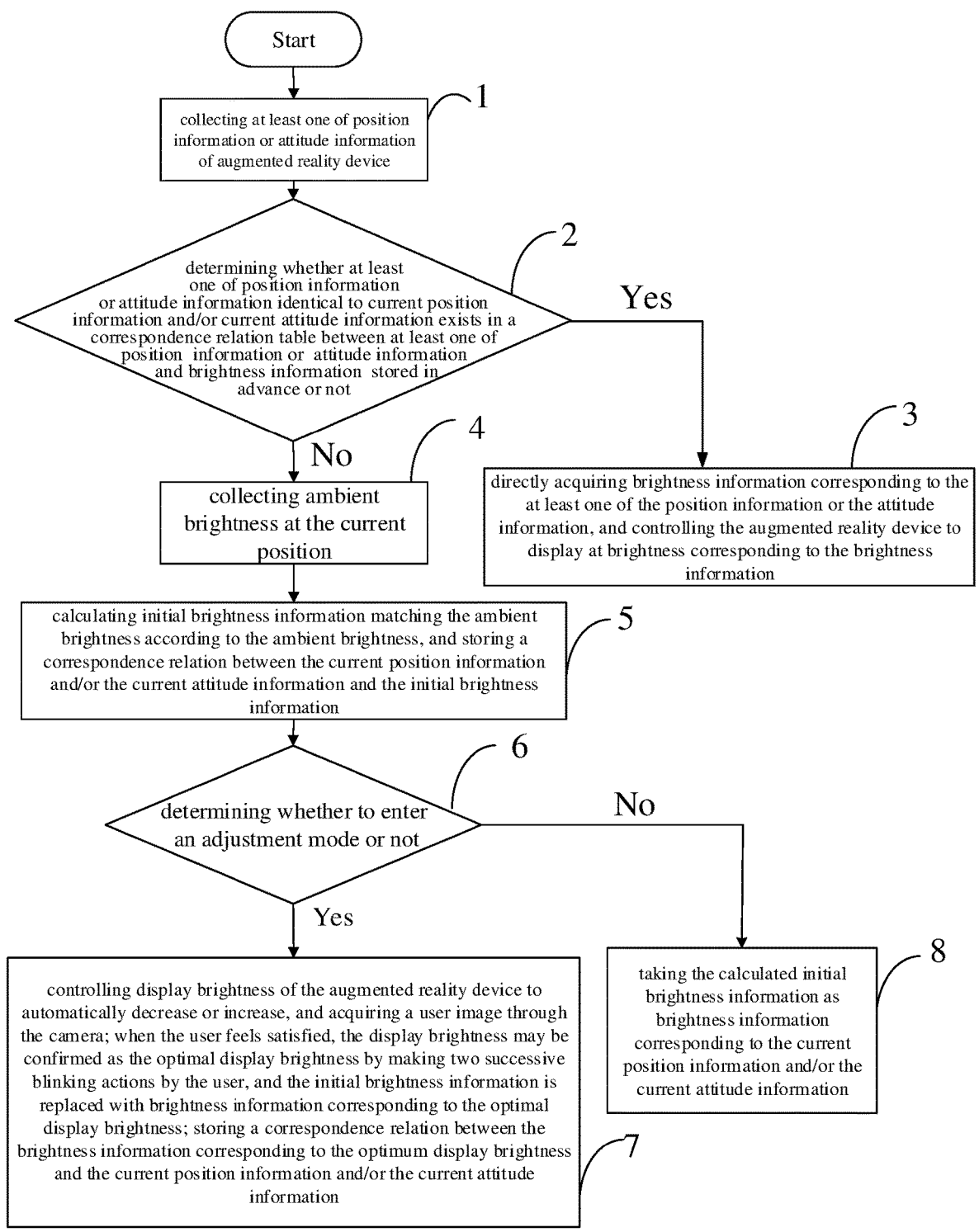
FIG. 5 is a specific flowchart of a brightness adjustment method of the present disclosure.

In this embodiment, the correspondence relation between the at least one of the position information or the attitude information and the brightness information may be established in advance, so that corresponding brightness information may be acquired only according to the at least one of the position information or the attitude information when the augmented reality device operates. As shown in FIG. 5, the brightness adjustment method of this embodiment includes the following steps 1-8.

Step 1: collecting at least one of position information or attitude information of the augmented reality device.

Step 2: determining whether at least one of position information or attitude information identical to current position information and/or current attitude information exists in a correspondence relation table between at least one of position information or attitude information and brightness information stored in advance or not.

Step 3: in a case that the identical position information and/or the identical attitude information exist, directly acquiring brightness information corresponding to the at least one of the position information or the attitude information, and controlling the augmented reality device to display at brightness corresponding to the brightness information.

Step 4: collecting ambient brightness at the current position in a case that the identical position information and/or the identical attitude information do not exist.

Step 5: calculating initial brightness information matching the ambient brightness according to the ambient brightness, and storing a correspondence relation between the current position information and/or the current attitude information and the initial brightness information, wherein the initial brightness information may be calculated according to an experimental data value.

Step 6: determining whether to enter an adjustment mode or not.

Step 7: in a case that the adjustment mode is to be entered, controlling display brightness of the augmented reality device to automatically decrease or increase, and acquiring a user image through the camera; when the user feels satisfied, the display brightness may be confirmed as the optimal display brightness by making two successive blinking actions by the user, and the initial brightness information is replaced with brightness information corresponding to the optimal display brightness; storing a correspondence relation between the brightness information corresponding to the optimum display brightness and the current position information and/or the current attitude information.

Step 8: in a case that the adjustment mode is not to be entered, taking the calculated initial brightness information as brightness information corresponding to the current position information and/or the current attitude information.

Figure 6:
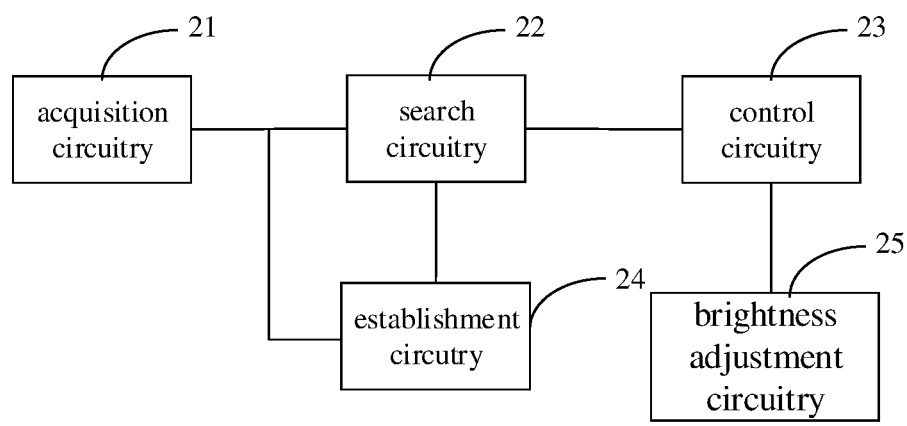
FIG. 6 is a structural block diagram of a brightness adjustment apparatus of the present disclosure.

Embodiments of the present disclosure also provide a brightness adjustment apparatus. The brightness adjustment apparatus is applied to an augmented reality device, and as shown in FIG. 6, the brightness adjustment apparatus includes an acquisition circuitry 21, a search circuitry 22, and a control circuitry 23.

The acquisition circuitry 21 is configured to acquire at least one of position information or attitude information of the augmented reality device. The search circuitry 22 is configured to determine a brightness corresponding to the acquired at least one of the position information or the attitude information according to an established correspondence relation between at least one of position information or attitude information and brightness information. The control circuitry 23 is configured to control the augmented reality device to display at the brightness.

In this embodiment, the correspondence relation between the at least one of the position information or the attitude information of the augmented reality device and the brightness information is established in advance. When adjusting the brightness of the augmented reality device, the brightness of the augmented reality device is directly determined according to the acquired at least one of the position information or the attitude information and the correspondence relation, and the brightness of the augmented reality device is no longer recalculated and adjusted. In this way, response time of the augmented reality device may be improved, power consumption of the augmented reality device may be reduced, in addition, an influence to the brightness due to errors in each brightness adjustment may be avoided, and consistency of the brightness of the augmented reality device may be improved.

The brightness adjustment apparatus is configured to implement the brightness adjustment method described above, and all of the steps in the above method embodiments of the present disclosure may be implemented by the brightness adjustment apparatus in the embodiment of the present disclosure.

The brightness adjustment apparatus of this embodiment is used to realize the brightness adjustment method described above, and the brightness adjustment apparatus of this embodiment may realize the steps in the method embodiment.

For example, in a case that an active range of the augmented reality device is within an enclosed space, the brightness corresponding to the at least one of the position information or the attitude information may be acquired according to the at least one of the position information or the attitude information of the augmented reality device. The position information of the augmented reality device includes a specific position of the augmented reality device in the enclosed space, and the attitude information includes an orientation, an angle, and the like of the augmented reality device.

For example, a user uses the augmented reality device in a room only. In a case that no natural light source is used for illumination in the room, but an artificial light source such as an electric lamp is used for illumination only, the ambient brightness is only related to a brightness of the artificial light source and is not affected by natural light. In a case that the brightness of the artificial light source is determined, the brightness of the real world seen by the augmented reality device is only related to the at least one of the position information or the attitude information of the augmented reality device. Thus, the at least one of the position information or the attitude information of the augmented reality device may be associated with the brightness of the augmented reality device. In a case that the user is at different positions and/or in different attitudes in the room, such as close to a large screen, close to a wall, close to the ground, or close to a window, brightnesses of the ambient light are different, so that the at least one of the position information or the attitude information of the augmented reality device may be acquired, and brightness information corresponding to the acquired at least one of the position information or the attitude information may be determined according to the established correspondence relation between the at least one of the position information or the attitude information and the brightness information of the augmented reality device, and the augmented reality device may be controlled to display at the brightness corresponding to the brightness information.

In a case that an augmented reality device is used in a museum, a gallery and another room, more users may use an augmented reality device. If the brightness of the augment reality device needs to be adjusted every time the augmented reality device is used, a large amount of time and power consumption will be consumed. In a case that the brightness of the augmented reality device used indoors is adjusted by the technical solution of the present embodiment, the brightness of the augmented reality device is directly determined according to the acquired at least one of the position information or the attitude information and the stored correspondence relation between the at least one of the position information or the attitude information and the brightness information, and the brightness of the augmented reality device is no longer recalculated and adjusted. In this way, the response time of the augmented reality device may be improved, the power consumption of the augmented reality device may be reduced, and the influence to the brightness due to errors in each brightness adjustment may be avoided, and the consistency of the brightness of the augmented reality device may be improved.

In particular, a position and an orientation of the augmented reality device may be acquired by a tracker sensor. The tracker sensor may detect the position and the orientation of the augmented reality device. The position of the augmented reality device may include a geographical coordinate (such as a Global Positioning System (GPS) coordinate of the augmented reality device) and/or a plane coordinate or a polar coordinate of the augmented reality device in the enclosed space. The orientation of the augmented reality device includes an angle of the augmented reality device relative to a reference line, such as an elevation angle or a depression angle of the augmented reality device relative to the ground and/or an orientation angle of the augmented reality device relative to a reference line in the enclosed space. The tracker sensor includes one or more of a 3-axis accelerometer, a 3-axis gyroscope, or a 3-axis magnetometer. After the tracker sensor detects movement of the augmented reality device, the position and/or the attitude of the augmented reality device may be determined based on an acceleration, an angular velocity, and the like detected by the tracker sensor. Of course, the tracker sensor employed in the present embodiment is not limited to a 3-axis accelerometer, a 3-axis gyroscope, a 3-axis magnetometer, etc. Any instrument capable of acquiring at least one of position information or attitude information may be used as the tracker sensor of the present embodiment.

Since the brightness of the augmented reality device needs to be determined according to the correspondence relation between the at least one of the position information or the attitude information and the brightness information, the correspondence relation between the at least one of the position information or the attitude information and the brightness information needs to be established in advance. If the correspondence relation between the at least one of the position information or the attitude information and the brightness information is not established in advance, it is necessary to collect a current ambient brightness outside the augmented reality device, determine, based on the collected ambient brightness, brightness information of the augmented reality device matching the ambient brightness, and control the augmented reality device to display at a brightness corresponding to the brightness information.

Optionally, the brightness adjustment apparatus further includes an establishment circuitry 24 configured to establish the correspondence relation between the at least one of the position information or the attitude information and the brightness information.

Figure 7:
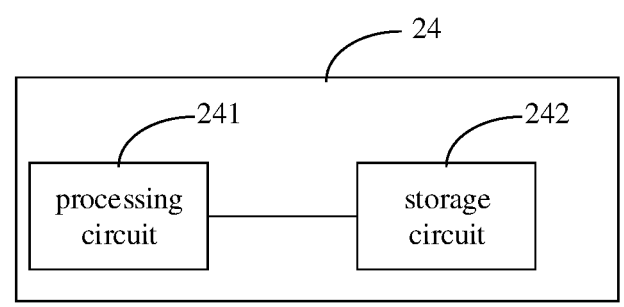
FIG. 7 is a block diagram of a detailed structure of the brightness adjustment apparatus of the present disclosure.

Further, referring to FIG. 7, the establishment circuitry 24 includes a processing circuit 241 and a storage circuit 242. The processing circuit 241 is configured to: collect ambient brightnesses when the augmented reality device is in different positions and/or different attitudes; and determine, based on the collected ambient brightnesses, brightness information of the augmented reality device matching the ambient brightnesses. The storage circuit 242 is configured to store a correspondence relation between the brightness information and the at least one of position information or attitude information corresponding to the positions and/or the attitude.

The ambient brightness may be acquired by a light collection device. The light collection device may include a light sensor, and the light sensor generates the current ambient light brightness according to current ambient light. Specifically, the light sensor may receive ambient light in a current environment, and convert the received light into an electrical signal, and an intensity of the light corresponds to a current value or a voltage value of the electrical signal. Thus, the electrical signal acquired by the light sensor according to the current ambient light may characterize the current ambient brightness. The light collection device may also be a camera, and the camera is configured to obtain a current environment image, obtain a current ambient brightness according to a brightness of the current environment image. Specifically, a brightness value of a certain pixel point may be acquired according to R, G, B values of the pixel point. For example, the brightness value=0.299r+0.587g+0.114b, wherein r, g, b correspond to the R, G, B values of the pixel point. An average brightness of the current environment image is acquired by calculating a brightness value of each pixel point of the collected current environment image, then calculating an average brightness of brightness values of all pixel points, and taking the acquired average brightness as the current ambient brightness.

Figure 8:
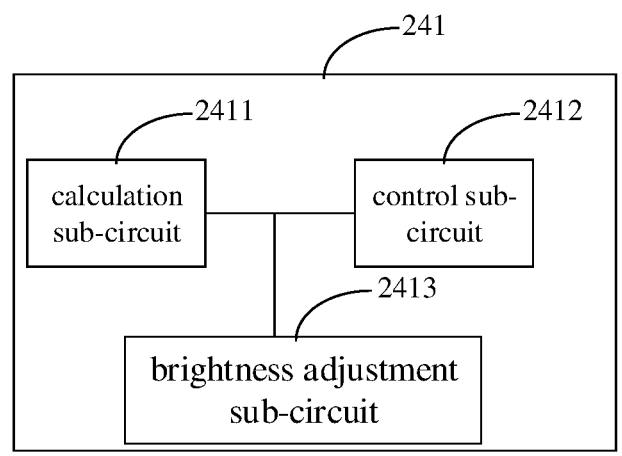
FIG. 8 is a block diagram of a detailed structure of the brightness adjustment apparatus of the present disclosure.

Further, referring to FIG. 8, the processing circuit 241 includes a calculation sub-circuit 2411, a control sub-circuit 2412, and a brightness adjustment sub-circuit 2413. The calculation sub-circuit 2411 is configured to calculate, based on the collected ambient brightness, an initial brightness of the augmented reality device matching the ambient brightness. The control sub-circuit 2412 is configured to control the augmented reality device to display at the initial brightness. The brightness adjustment sub-circuit 2413 is configured to receive a brightness adjustment instruction from a user, and adjust a display brightness of the augmented reality device according to the brightness adjustment instruction; and repeat the previous step until a user's brightness confirmation instruction is received from the user, and determine that the current brightness information of the augmented reality device is the brightness information of the augmented reality device matching the ambient brightness.

The brightness adjustment instruction and the brightness confirmation instruction may be an eye action of the user collected by a camera of the augmented reality device, and may also be an operation instruction inputted by the user through an input device of the augmented reality device. In particular, an eye state of the user may be detected by the camera, the eye state includes an eye-open amplitude between upper and lower eyelids, an eye-closure, and a blink frequency. In a case that the camera acquires a condition that the eye-open amplitude of the user is smaller than a first preset amplitude or the blink frequency is larger than a first preset value, it may be considered that the current display brightness is over large, and the current display brightness needs to be lowered until the eye-opening amplitude of the user is not less than the first preset amplitude or the blink frequency is not larger than the first preset value. In a case that the camera acquires a condition that the eye-open amplitude of the user is larger than a second preset amplitude or the blink frequency is smaller than a second preset value, it may be considered that the current display brightness is over small, it is necessary to increase the current display brightness until the eye-opening amplitude of the user is not larger than the second preset amplitude or the blink frequency is not smaller than the second preset value, wherein the eye-opening amplitude and the blink frequency of the user are the above-mentioned eye actions of the user.

The user may also adjust the display brightness of the augmented reality device by using an input device (such as a brightness adjustment button) of the augmented reality device, and confirm the display brightness by using a brightness confirmation button of the augmented reality device after the display brightness is adjusted to an appropriate display brightness.

In a specific example, after the brightness adjustment instruction of the user is inputted, the display brightness of the augmented reality device may be automatically lowered or raised, and when the user is satisfied with the display brightness, the display brightness may be confirmed as an optimal display brightness by two consecutive blinking actions, and brightness information corresponding to the optimum display brightness may be recorded and stored.

In another specific embodiment, corresponding brightness information may be acquired by combining time information with the at least one of the position information or the attitude information. In some scenarios, the ambient brightness is associated with both the time information and the at least one of the position information or the attitude information, such as a position A at a noon time period corresponds to an ambient brightness value, the position A at an afternoon time period corresponds to another ambient brightness value. Since the display brightness of the augmented reality device is mainly influenced by the ambient brightness, the brightness information of the augmented reality device is associated with both the time information and the at least one of the position information or the attitude information.

Different correspondence relations between the at least one of the position information or the attitude information and the brightness information at different time points may be established in advance. When a user uses the augmented reality device, current time may be acquired, and brightness information corresponding to the current time and the acquired at least one of the position information or the attitude information may be determined according to different correspondence relations between the at least one of the position information or the attitude information and the brightness information at different time points, and the augmented reality device may be controlled to display at the brightness corresponding to the brightness information.

The current time may be acquired by using a clock on the augmented reality device, and the current time may also be acquired by receiving time information sent from the outside. The current time may be a fixed time period, such as a noon time period, an afternoon time period, an evening time period, and the like.

Further, the acquisition circuitry 21 is further configured to acquire the current time.

The correspondence relation between the at least one of the position information or the attitude information and the brightness information includes correspondence relations between the at least one of the position information or the attitude information and the brightness information at different time points. The search circuitry 22 is specifically configured to determine the brightness information corresponding to the current time and the acquired at least one of the position information or the attitude information according to the correspondence relations between the at least one of the position information or the attitude information and the brightness information at different time points.

In another specific embodiment, corresponding brightness information may also be acquired in combination with time, weather, and at least one of position information or attitude information. In some scenarios, that ambient brightness is associated with all of the time, the weather and the at least one of the position information or the attitude information, such as the position A at the noon time period of a sunny day corresponds to a first ambient brightness value, the position A at the afternoon time period of the sunny day corresponds to a second ambient brightness value, the position A at the noon time period of an overcast day corresponds to a third ambient brightness value, and the position A at the afternoon time period of the overcast day corresponds to a fourth ambient brightness value, because the display brightness of the augmented reality device is mainly affected by the ambient brightness, the brightness information of the augmented reality device is associated with all of the time, the weather, and the at least one of the position information or the attitude information.

Different correspondence relations between at least one of position information or attitude information and brightness information at different time periods and/or under different weather conditions may be established in advance. When a user uses the augmented reality device, the current time and/or the current weather may be acquired. Brightness information corresponding to the current time, the current weather, and the acquired at least one of the position information or the attitude information may be determined according to different correspondence relations between the at least one of the position information or the attitude information and the brightness information at different time points and/or under different weather conditions, and further the augmented reality device may be controlled to display at the brightness corresponding to the brightness information.

The current time may be acquired by using a clock on the augmented reality device, and the current time may also be acquired by receiving time information sent from the outside. The current time may be a fixed time period, such as the noon time period, the afternoon time period, the evening time period, and the like.

The weather information sent from the outside may be received to obtain the current weather, such as a sunny day, an overcast day, a rainy day, etc., and a weather mode for the augmented reality device may be manually selected by the user. Under each weather mode, different correspondence relations between at least one of position information or attitude information and brightness information at different time periods are stored. When brightness adjustment is performed, a weather mode to which the current weather belongs is firstly determined, then corresponding brightness information is searched by using the correspondence relation between the brightness information and the at least one of the position information or the attitude information at the current time and under the weather mode.

Optionally, the acquisition circuitry 21 is further configured to acquire the current weather.

The correspondence relation between the at least one of the position information or the attitude information and the brightness information includes different correspondence relations between the at least one of the position information or the attitude information and the brightness information at different time points and/or under different weather conditions. The search circuitry 22 is specifically configured to determine brightness information corresponding to the current time, the current weather, and the acquired at least one of the position information or the attitude information.

Further, the device further includes a brightness adjustment circuitry 25 configured to receive a brightness adjustment instruction from a user; adjust a display brightness of the augmented reality device according to the brightness adjustment instruction; and repeat the above steps until a brightness confirmation command is received from the user.

After the brightness information of the augmented reality device is directly determined, the embodiment may also enable a micro-adjustment of the display brightness of the augmented reality device according to an instruction of the user, so as to meet different requirements of different people on brightness. Since a process of the brightness adjustment is fine-tuned on a basis of determining the brightness information of the augmented reality device, a magnitude of the brightness adjustment is small and therefore the time taken for the adjustment is shorter than the time required for an associated brightness adjustment, whereas effects of improving the response time of the augmented reality device and reducing the power consumption of the augmented reality device may still be achieved.

The brightness adjustment instruction and the brightness confirmation instruction may be an eye action of the user collected by a camera of the augmented reality device, and may also be an operation instruction inputted by the user through an input device of the augmented reality device. In particular, an eye state of the user may be detected by the camera, the eye state includes an eye-open amplitude between upper and lower eyelids, an eye closure, and a blink frequency. In a case that the camera acquires a condition that the eye-open amplitude of the user is smaller than a first preset amplitude or the blink frequency is larger than a first preset value, it may be considered that the current display brightness is over large, and the current display brightness needs to be lowered until the eye-opening amplitude of the user is not less than the first preset amplitude or the blink frequency is not larger than the first preset value. In a case that the camera acquires a condition that the eye-open amplitude of the user is larger than a second preset amplitude or the blink frequency is smaller than a second preset value, it may be considered that the current display brightness is over small, it is necessary to increase the current display brightness until the eye-opening amplitude of the user is not larger than the second preset amplitude or the blink frequency is not smaller than the second preset value, wherein the eye-opening amplitude and the blink frequency of the user are the above-mentioned eye actions of the user. The user may also adjust the display brightness of the augmented reality device by using a brightness adjustment button of the augmented reality device, and confirm the display brightness by using a brightness confirmation button of the augmented reality device after the display brightness is adjusted to an appropriate display brightness.

Further, after the brightness confirmation instruction is received from the user, the correspondence relation established in advance between the at least one of the position information or the attitude information and the brightness information may be updated according to the current brightness information of the augmented reality device, and the current brightness of the augmented reality device is stored as brightness information corresponding to the at least one of the position information or the attitude information.

Embodiments of the present disclosure also provide an augmented reality device including a brightness adjustment apparatus as described above.

Figure 9:
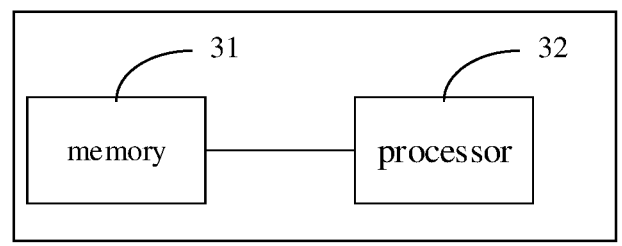
FIG. 9 is another structural block diagram of the brightness adjustment apparatus of the present disclosure.

In reference to FIG. 9, an embodiment of that present disclosure also provides a brightness adjustment apparatus including a memory 31, a processor 32, and a computer program stored on the memory 31 and executable by the processor 32, wherein the steps in the brightness adjustment method as described above are implemented when the computer program is executed by the processor 32.

Some embodiments of that present disclosure provide a non-volatile computer-readable storage medium on which a computer program is stored, wherein the steps in the brightness adjustment method as described above are implemented when the computer program is executed by a processor.

Embodiments of the present disclosure have the following beneficial effects: in the above solutions, the correspondence relation between the at least one of the position information or the attitude information of the augmented reality device and the brightness information is established in advance; when adjusting the brightness of the augmented reality device, the brightness of the augmented reality device is directly determined according to the acquired at least one of position information or attitude information and the correspondence relation, and the brightness of the augmented reality device is no longer recalculated and adjusted. In this way, response time of the augmented reality device may be improved, power consumption of the augmented reality device may be reduced, in addition, an influence to the brightness due to errors in each brightness adjustment may be avoided, and consistency of the brightness of the augmented reality device may be improved.

Additionally, the present disclosure may also enable a micro-adjustment of the display brightness of the augmented reality device according to an instruction of the user, so as to meet different requirements of different people on brightness. Since a process of the brightness adjustment is fine-tuned on a basis of determining the brightness information of the augmented reality device, a magnitude of the brightness adjustment is small and therefore the time taken for the adjustment is shorter than the time required for an associated brightness adjustment, whereas effects of improving the response time of the augmented reality device and reducing the power consumption of the augmented reality device may still be achieved.

It may be appreciated that the embodiments described herein may be implemented in hardware, software, firmware, middleware, a microcode, or a combination thereof. For a hardware implementation, a processing circuit may be implemented in one or more application specific integrated circuits (ASICs), a digital signal processor (DSP), a DSP device (DSPD), a Programmable Logic Device (PLD), a Field-Programmable Gate Array (FPGA), a general purpose processor, a controllers, microcontroller, a microprocessors, other electronic circuits for performing the functions described herein, or a combination thereof.

The aforementioned storage medium includes various media capable of storing program codes such as a U disk, a mobile hard disk, a Read-Only Memory (ROM), a Random Access Memory (RAM), a magnetic disk, or an optical disk.

Various embodiments in this specification are described in a progressive manner, and each embodiment focuses on differences from the other embodiments, and the same and similar parts between the various embodiments may be referred to each other.

Embodiments of the present disclosure are described with reference to flowcharts and/or block diagrams of methods, user terminals (systems), and computer program products according to embodiments of the present disclosure. It should be understood that each flow and/or block in a flowchart and/or a block diagram, and a combination of flow and/or blocks in the flowchart and/or block diagram, may be implemented by computer program instructions. These computer program instructions may be provided to a processor of a general purpose computer, a special purpose computer, an embedded processing device, or another programmable data processing user terminal to generate a machine, such that instructions executed by a processor of a computer or another programmable data processing user terminal generate means for implementing functions specified in one or more of the flow charts and/or one or more of the blocks of the block chart.

These computer program instructions may also be stored in a computer readable storage capable of directing a computer or other programmable data processing user terminal to operate in a particular manner, so that instructions stored in the computer readable storage may generate an article of manufacture that includes an instruction device, the instruction device implements functions specified in one or more of the flow charts and/or one or more blocks of the block diagrams.

These computer program instructions may also be loaded onto a computer or another programmable data processing user terminal such that a series of operational steps are performed on the computer or the another programmable user terminal to produce a computer-implemented processing, so that an instruction executed on the computer or the another programmable user terminal provide steps for implementing function specified in one or more of the flowcharts and/or one or more of the blocks of the block diagrams.

Although optional embodiments of embodiments of the present disclosure have been described, additional changes and modifications may be made to these embodiments once those skilled in the art have learned a basic inventive concept. Therefore, the appended claims are intended to be construed as including optional embodiments and all modifications and modifications falling within the scope of embodiments of the present disclosure.

It should also be noted that in the present disclosure, relational terms such as first and second, etc. are used only to distinguish one entity or operation from another entity or operation, but are not used to require or imply existence of any such actual relation or order between these entities or operations. Moreover, such terms as "comprising", "including", or any other variant thereof is intended to cover a non-exclusive inclusion such that a process, a method, an article or a user terminal including a series of elements includes not only those elements, but also include other elements that are not explicitly listed, or elements inherent to such processes, methods, articles, or user terminals. Elements defined by a statement "comprising one of . . . ", without further limitation, do not exclude presence of additional identical elements in the process, the method, the article or the user terminal including the elements.

What has been described above are optional embodiments of the present disclosure and it should be noted that several improvements and refinements may be made by those of ordinary skill in the art without departing from the principles described herein. These improvements and refinements are also within the scope of the present disclosure.

What is claimed is:

1. A brightness adjustment method applied to an augmented reality device, comprising:
   acquiring at least one of position information or attitude information of the augmented reality device;
   establishing a correspondence relation between brightness information and at least one of position information or attitude information;
   determining a brightness corresponding to the acquired at least one of the position information or the attitude information according to the established correspondence relation between brightness information and at least one of position information or attitude information; and
   controlling the augmented reality device to display at the brightness,
   wherein establishing the correspondence relation between brightness information and at least one of position information or attitude information comprises:
      collecting an ambient brightness corresponding to the augmented reality device being at a position and/or at an attitude;
      determining brightness information of the augmented reality device matching the ambient brightness based on the collected ambient brightness; and
      storing a correspondence relation between the brightness information and the at least one of position information or attitude information corresponding to the position and/or the attitude.

2. The brightness adjustment method according to claim 1, further comprising:
   acquiring at least one of current time or a current weather;
   wherein the correspondence relation between brightness information and at least one of position information or attitude information includes a correspondence relation between brightness information and at least one of position information or attitude information under at least one of (i) different times or (ii) different weathers, and
   wherein determining the brightness corresponding to the acquired at least one of the position information or the attitude information comprises:
      determining the brightness corresponding to the acquired at least one of the position information or the attitude information and corresponding to at least one of the current time or the current weather.

3. The brightness adjustment method according to claim 1, wherein after controlling the augmented reality device to display at the brightness, the method further comprises:
receiving a brightness adjustment instruction from a user and adjusting the brightness of the augmented reality device according to the brightness adjustment instruction; and
repeating the above step until a brightness confirmation instruction is received from the user.

4. The brightness adjustment method according to claim 3, wherein the brightness adjustment instruction and the brightness confirmation instruction are user eye actions collected by the augmented reality device or operation instructions inputted by the user.

5. The brightness adjustment method according to claim 1, wherein determining the brightness information of the augmented reality device matching the ambient brightness based on the collected ambient brightness comprises:
calculating an initial brightness of the augmented reality device matching the ambient brightness based on the collected ambient brightness;
controlling the augmented reality device to display at the initial brightness;
receiving a brightness adjustment instruction from a user;
adjusting the initial brightness of the augmented reality device according to the brightness adjustment instruction; and
repeating the previous step of adjusting the initial brightness of the augmented reality device according to the brightness adjustment instruction, until a brightness confirmation instruction is received from the user, and determining current brightness information of the augmented reality device as the brightness information of the augmented reality device matching the ambient brightness.

6. The brightness adjustment method according to claim 5, wherein collecting the ambient brightness comprises collecting the ambient brightness from ambient light, or collecting the ambient brightness from a brightness of an ambient image.

7. The brightness adjustment method according to claim 6, wherein:
collecting the ambient brightness from the ambient light comprises converting the ambient light into an electrical signal and determining the ambient brightness based on the electrical signal; and
collecting the ambient brightness from the brightness of the ambient image comprises capturing the ambient image, and determining the ambient brightness from a brightness value=0.299r+0.587g+0.114b, wherein r, g, b correspond to R, G, B values of a pixel point in the collected ambient image, respectively.

8. A brightness adjustment apparatus, comprising:
a memory, a processor, and a computer program stored on the memory and executable by the processor, wherein when the computer program is executed by the processor, the processor implements the steps in the brightness adjustment method according to claim 1.

9. A non-transitory computer readable storage medium, comprising:
a computer program stored on the computer readable storage medium, wherein, when the computer program is executed by a processor, the processor implements the steps in the brightness adjustment method according to claim 1.

10. A brightness adjustment apparatus applied to an augmented reality device, comprising:
an acquisition circuitry, configured to acquire at least one of position information or attitude information of the augmented reality device;
an establishment circuitry, configured to establish a correspondence relation between brightness information and at least one of position information or attitude information;
a search circuitry, configured to determine a brightness corresponding to the acquired at least one of the position information or the attitude information according to the established correspondence relation between brightness information and at least one of position information or attitude information; and
a control circuitry, configured to control the augmented reality device to display at the brightness,
wherein the establishment circuitry specifically comprises:
a processing circuit configured to collect an ambient brightness corresponding to the augmented reality device being at a position and/or at an attitude, and determine brightness information of the augmented reality device matching the ambient brightness based on the collected ambient brightness; and
a storage circuit, configured to store a correspondence relation between the brightness information and the at least one of position information or attitude information corresponding to the position and/or the attitude.

11. The brightness adjustment apparatus according to claim 10, wherein the acquisition circuitry is further configured to acquire at least one of current time or a current weather, and wherein:
the correspondence relation between brightness information and at least one of position information or attitude information includes a correspondence relation between brightness information and at least one of position information or attitude information under at least one of (i) different times or (ii) different weathers, and
the search circuitry is further configured to determine the brightness corresponding to the acquired at least one of the position information or the attitude information and corresponding to at least one of the current time or the current weather.

12. The brightness adjustment apparatus according to claim 10, further comprising a brightness adjustment circuitry configured to:
receive a brightness adjustment instruction from a user and adjust the brightness of the augmented reality device according to the brightness adjustment instruction; and
repeat the above step until a brightness confirmation instruction is received from the user.

13. The brightness adjustment apparatus according to claim 12, wherein the brightness adjustment instruction and the brightness confirmation instruction are user eye actions collected by the augmented reality device or operation instructions inputted by the user.

14. The brightness adjustment apparatus according to claim 10, wherein the processing circuit comprises:
a calculation sub-circuit, configured to calculate an initial brightness of the augmented reality device matching an ambient brightness based on a collected ambient brightness;

a control sub-circuit, configured to control the augmented reality device to display at the initial brightness; and
a brightness adjustment sub-circuit, configured to:
receive a brightness adjustment instruction from a user;
adjust the initial brightness of the augmented reality device according to the brightness adjustment instruction;
repeat the previous step of adjusting the initial brightness of the augmented reality device according to the brightness adjustment instruction, until a brightness confirmation instruction is received from the user; and
determine current brightness information of the augmented reality device as the brightness information of the augmented reality device matching the ambient brightness.

15. The brightness adjustment apparatus according to claim 14, wherein the processor is configured to collect the ambient brightness by collecting the ambient brightness from ambient light, or by collecting the ambient brightness from a brightness of an ambient image.

16. An augmented reality device, comprising:
the brightness adjustment apparatus according to claim 10.

17. A brightness adjustment method applied to an augmented reality device, comprising:
acquiring at least one of position information or attitude information of the augmented reality device;
determining a brightness corresponding to the acquired at least one of the position information or the attitude information according to an established correspondence relation between brightness information and at least one of position information or attitude information;
controlling the augmented reality device to display at the brightness;
receiving a brightness adjustment instruction from a user and adjusting the brightness of the augmented reality device according to the brightness adjustment instruction; and
repeating the above step until a brightness confirmation instruction is received from the user,
wherein the brightness adjustment instruction and the brightness confirmation instruction are user eye actions collected by the augmented reality device or operation instructions inputted by the user.

* * * * *